(12) United States Patent
Albrecht et al.

(10) Patent No.: US 8,195,767 B2
(45) Date of Patent: Jun. 5, 2012

(54) METHOD AND SOFTWARE FOR REDUCING SERVER REQUESTS BY A BROWSER

(75) Inventors: Frank H. Albrecht, Walldorf (DE); David Sommer, Bruehl (DE); Jochen Rundholz, Leimen (DE)

(73) Assignee: SAP AG, Walldorf (DE)

( * ) Notice: Subject to any disclaimer, the term of this patent is extended or adjusted under 35 U.S.C. 154(b) by 231 days.

(21) Appl. No.: 12/341,547

(22) Filed: Dec. 22, 2008

(65) Prior Publication Data

US 2010/0161717 A1    Jun. 24, 2010

(51) Int. Cl.
*G06F 15/16*    (2006.01)
(52) U.S. Cl. ......... 709/219; 709/217; 707/705; 707/821
(58) Field of Classification Search ............... 709/203, 709/217, 219; 707/1, 10, 705, 821
See application file for complete search history.

(56) References Cited

U.S. PATENT DOCUMENTS

| | | | |
|---|---|---|---|
| 6,598,048 B2 * | 7/2003 | Carneal et al. .................. 1/1 |
| 2004/0049579 A1 * | 3/2004 | Ims et al. ..................... 709/225 |
| 2005/0144186 A1 * | 6/2005 | Hesselink et al. ............ 707/101 |
| 2005/0222986 A1 | 10/2005 | Heix et al. |
| 2007/0124415 A1 * | 5/2007 | Lev-Ran et al. .............. 709/217 |
| 2009/0006492 A1 | 1/2009 | Heix et al. |
| 2009/0077112 A1 * | 3/2009 | Albrecht et al. ............. 707/102 |
| 2009/0083293 A1 * | 3/2009 | Albrecht et al. ............. 707/100 |

* cited by examiner

*Primary Examiner* — Frantz Jean
(74) *Attorney, Agent, or Firm* — Fish & Richardson P.C.

(57) ABSTRACT

This disclosure provides various embodiments of systems, software, and computerized methods for reducing the number of server requests sent to a web server. In one aspect, the software generates a file reference uniquely identifying a version of a file capable of being cached by a requester. The file reference can comprise a network-addressable location of the version of the cacheable file and a parameter uniquely identifying the version of the cacheable file, where the parameter is separated from the network-addressable location of the version of the cacheable file. The software can further embed the file reference into a web page file, and send the web page file in response to a request for the web page. The parameter may include a plurality of data elements, such as a second instance of the file name, a timestamp, or a version number of the cacheable file.

28 Claims, 6 Drawing Sheets

METHOD AND SOFTWARE FOR REDUCING SERVER REQUESTS BY A BROWSER

TECHNICAL FIELD

The present disclosure relates to methods and software for web browsing, and, more particularly, to systems, software, and computer implemented methods for reducing the number of server requests made by a client.

BACKGROUND

Caches are typically used by web browsers and other web-based applications to store information previously received from a web server, such as web pages and elements within those web pages that have been sent to the web browser. In general, a cache is a collection of data duplicating original values stored elsewhere or computed earlier, where the original data is expensive to retrieve (owing to longer access time) or to compute, compared to the cost of reading from the cache. Stated differently, a cache is a temporary storage area where frequently accessed data can be stored for rapid access. Once data is stored in the cache, future uses of the data can be made by accessing the cached copy rather than re-requesting and receiving, or re-computing the original data, so that the average access time is shorter. Specifically, web caches can be used to reduce the amount of information required to be transmitted across a network, such as from the web server to the requesting system, as information sent in previous interactions between the web browser and web server can be stored in the cache associated with the web browser and re-used when the same web page or related elements are later requested. Among other advantages, the use of a web cache can reduce the bandwidth and processing requirements of the web server, as well as improve the responsiveness and speed for retrieving and presenting data to a user by the web browser.

In some instances, a particular web page may be associated with one or more image files and/or other cacheable elements (e.g., video, audio, or other related files). Without using a cache to store the previously-received versions of the particular web page and/or the elements associated therewith, each time the particular web page is requested all of the data associated with the page is re-sent from the web server to the requesting entity. In cases of high latency of the network connection, recurring and excessive requests for the particular web page by multiple users, each requesting the entirety of the data associated with the web page (which in turn may cause individual server requests for the web page as well as each element included within the web page), can cause increased load times, loading timeouts, and other errors associated with requests from multiple users and systems attempting to access the particular web page, as well as for other web pages and applications hosted or served by the same web server.

One solution for limiting the number of requests sent to a web server used in connection with a web page and/or file cache has been to extend the default caching time (or cache timeout) associated with particular web pages or for the settings of the web browser itself. By extending the cache timeout of a web browser (i.e., the time between when the web browser stores a web page and/or related element in a cache and when the web browser sends a request to the web server to update the previously-cached web page and/or related element), the number of requests to the web server may be reduced while allowing for quicker loading of the requested web page and its related elements directly from the information stored in the cache. However, this solution provides a potential trade-off between browser performance and the flexibility of updating content associated with the particular web page. If the web page or related element (i.e., a file, embedded image, or another portion of a cached web page) is modified or updated at the web server prior to the expiration of the extended cache time, the web browser (and its associated user) will not be notified of the change until the cached information expires or the cache reaches its default cache timeout. For example, if the web browser has a default cache time of one week, then the web browser will check once a week to see if the cached version of each file is still valid. Changes to any of the files made at the web server during that time will appear only after the default time (i.e., a week) passes, or if the user explicitly requests that the web browser reload or revalidate the cached files. Further, even if the web page or related elements have not been updated, the web browser will still request a new version of the web page and related elements upon expiration of the defined cache value.

SUMMARY

This disclosure provides various embodiments of software and computerized methods for reducing the number of server requests sent to a web server. In one aspect, the software generates a file reference uniquely identifying a version of a file capable of being cached by a requester. The file reference can comprise a network-addressable location of the version of the cacheable file and a parameter uniquely identifying the version of the cacheable file, where the parameter is separated from the network-addressable location of the version of the cacheable file. The software can further embed the file reference into a web page file, and send the web page file in response to a request for the web page. The parameter may include a plurality of data elements, such as a second instance of the file name, a timestamp, or a version number of the cacheable file.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
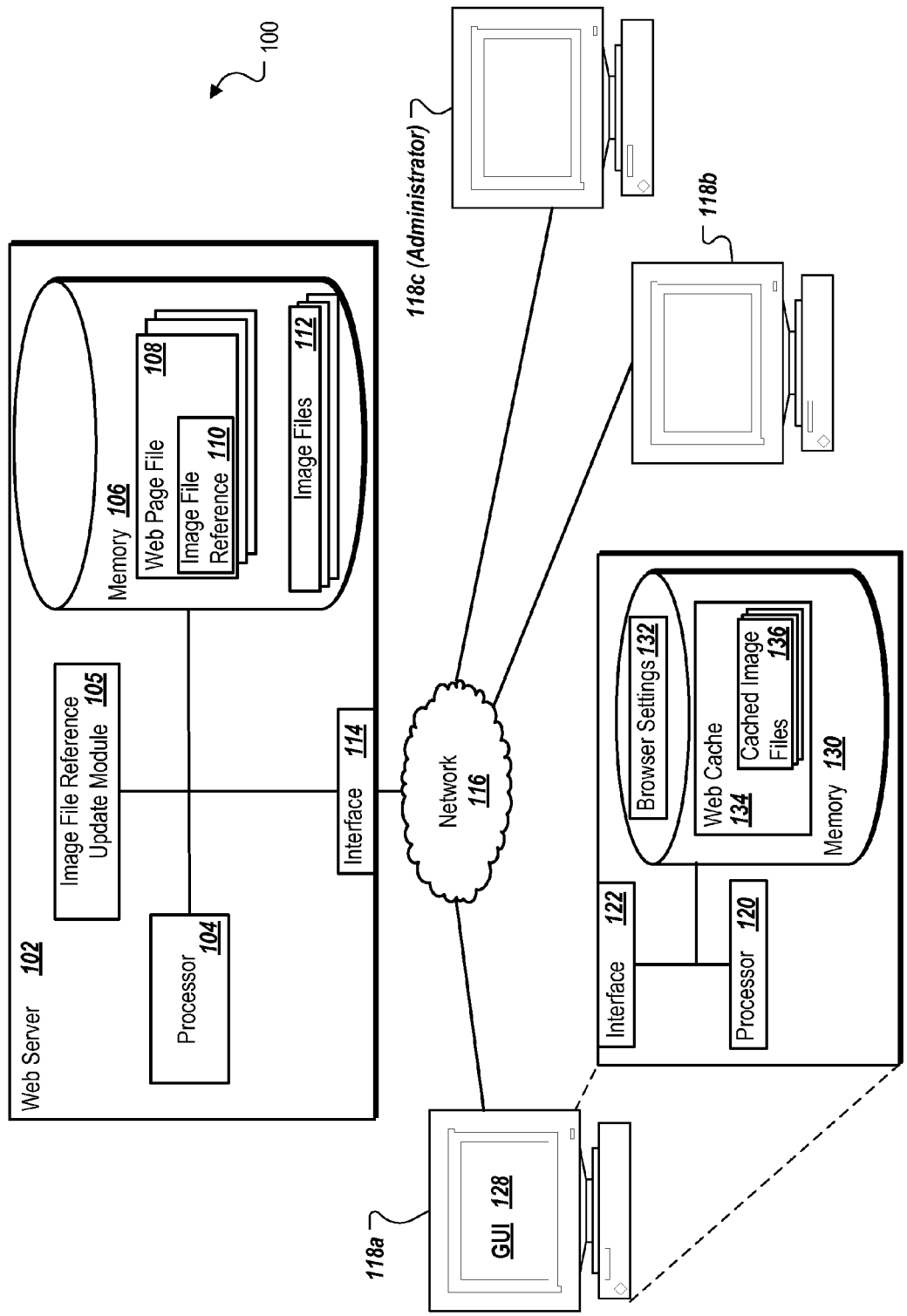
FIG. 1A illustrates an example system for reducing the number of server requests made by a client in accordance with one embodiment of the present disclosure.

This disclosure generally describes software, computerized methods, and systems for reducing the number of server requests sent by a client to a web server (or servers) associated with a particular web page. This request reduction can be realized by modifying the information included within each web page file defining the cacheable files associated with or embedded within a particular web page. The modified file information can be used to identify whether the files embedded within the web page have been updated at the web server since the client's last web page request by providing a unique parameter or identifier associated with the current version of the file, allowing the client to quickly and efficiently determine whether the most current version of the embedded file is locally available to the client in a cache or other local storage, or whether additional server requests are necessary to retrieve the updated versions of the embedded files. Specifically, each file associated with the particular web page, such as an image file or another appropriate file embedded within the web page's source code (e.g., the hypertext markup language (HTML) of the page), may generally be referenced by a specific universal resource locator (URL) included within the web page's source code that defines where on the web server (or at another location) the particular embedded file is located. Upon initially requesting the particular web page, a web browser at the requesting client interprets the web page's source code and sends a second request to retrieve the file from the specific URL listed within the web page (whether that file is located at the web server in a separate location), and, upon receiving the appropriate file from the specific URL, stores the file in a cache located at the client.

As an example, a particular web page may require ten (10) separate server requests to retrieve the entirety of the web page and its related files. Further, typical network latency for receiving and responding to requests across a satellite connection may be around 500 milliseconds (ms). If 20,000 users access the web page, and each users' default cache timeout is one (1) week, then the particular web page alone requires 200,000 server requests per week, regardless of whether the content associated with the web page has changed. As such, by using systems utilizing or otherwise implementing techniques such as those disclosed here, the loading time of this example page could be reduced by up to five (5) seconds per user for each load.

Specifically, in order to reduce server requests by a web browser, the present disclosure describes a method and software for appending a parameter or other identifier to the end of the specific URL embedded within the web page that defines the appropriate location of the associated file such that the combination of the URL and appended parameter uniquely define the most current version of the associated file. When the web browser sends a second request to the web server for the particular web page, the web page and the embedded file's URL information (which includes the appended file parameter) are included in the web server's response. The client's web browser retrieves the associated file's URL information from the web page source code, identifies the appended unique parameter included within the file's URL information, and compares the URL information (including the appended file parameter) to the files currently stored in the client's cache. If the web browser determines that the file uniquely defined by the received URL information is already stored in the client's cache, the web browser recognizes that no additional server requests for the associated file are necessary, as the most current version of the file is locally available and stored in the client's cache. The version of the file cached at the client can then be retrieved and used to quickly and efficiently complete the visual presentation of the particular web page to the user of the client. However, if the web browser determines that the file's unique URL (including the appended unique identifier) is not available or not included within the client's cache, then the web browser can send a request to the appropriate file URL at the web server (or another location) to retrieve the most current version of the file. Once the current version of the file is received, the particular web page can be presented to the client's users with the updated version of the file.

The present disclosure allows the cache timeout for the web browser to be set at a very high interval (e.g., six months, a year, etc.). In doing so, the number of potentially unnecessary and repetitive web browser requests for unchanged information at the web server is diminished. Additionally, the present disclosure causes each server request for the associated file to be meaningful. In other words, server requests for the files associated with a certain web page are only sent by the client in order to retrieve new or update out-of-date versions of the file stored in the client's cache to ensure that the latest versions of the file are available at the client. Additionally, web server performance may further be maximized by storing only the current version of the associated file at the web server, overwriting previous versions of the associated file when modifications or updates to the file are made, thereby freeing additional memory and storage space by minimizing the files stored at the web server.

Turning to the example implementation of FIG. 1, the illustrated environment 100 includes or is communicably coupled with web server 102 and one or more clients 118 (although only one client is illustrated in FIG. 1, a plurality of clients 118 may be included in environment 100), at least some of which communicate across network 116. In general, environment 100 depicts an example configuration of a system capable of reducing the number of server requests sent to the web server 102 by client 118.

In general, web server 102 is any web server that stores one or more web page files 108, where at least a portion of the web page files 108 can be communicated or transmitted to users or clients within and communicably coupled to the illustrated environment 100 of FIG. 1. In some instances, web server 102 may dynamically generate or update web page files 108 "on the fly," or when requests for those web page files 108 are received. At a high level, the web server 102 comprises an electronic computing device operable to receive, transmit, process, store, or manage data and information associated with the environment 100. It will be understood that the term "web server" can include any suitable component or module for providing or serving networked pages, such as networked business applications. Specifically, the web server 102 illustrated in FIG. 1 is responsible for receiving hypertext transfer protocol (HTTP) requests from the client 118 for one or more web pages 108 stored at the web server 102 and responding to the received requests by serving, or sending, the requested web page files 108 to the requesting client 118 via an HTTP response using the network 116. In addition to the client 118 illustrated in FIG. 1, web page requests may also be sent from internal users, external or third party customers, and automated applications, as well as other appropriate entities, individuals, systems, or computers. As used in the present disclosure, the term "computer" is intended to encompass any suitable processing device. For example, although FIG. 1 illustrates a single web server 102, environment 100 can be implemented using two or more web servers 102, as well as computers others than servers, including a server pool. Indeed, web server 102 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Illustrated web server 102 may be adapted to execute any operating system including Linux, UNIX, Windows Server, or any other suitable operating system. According to one embodiment, web server 102 may also include or be communicably coupled with a mail server.

In the present implementation, and as shown in FIG. 1, the web server 102 includes an interface 114, a processor 104, a memory 106, and an image file reference update module 105. The interface 114 is used by the web server 102 for communicating with other systems in a client-server or other distributed environment (including within environment 100) connected to the network 116 (e.g., client 118, as well as other systems communicably coupled to the network 116). Generally, the interface 114 comprises logic encoded in software and/or hardware in a suitable combination and operable to communicate with the network 116. More specifically, the interface 114 may comprise software supporting one or more communication protocols associated with communications such that the network 116 or hardware is operable to communicate physical signals within and outside of the illustrated environment 100.

Generally, the network 116 facilitates wireless or wireline communications between the components of the environment 100 (i.e., between the web server 102 and client 118), as well as with any other local or remote computer, such as additional clients, servers, or other devices communicably coupled to network 116 but not illustrated in FIG. 1. The network 116 is illustrated as a single network in FIG. 1, but may be a continuous or discontinuous network without departing from the scope of this disclosure, so long as at least a portion of the network 114 may facilitate communications between senders and recipients. The network 114 may be all or a portion of an enterprise or secured network, while in another instance at least a portion of the network 114 may represent a connection to the Internet. In some instances, a portion of the network 114 may be a virtual private network (VPN), such as, for example, the connection between the client 118 and the web server 102. Further, all or a portion of the network 114 can comprise either a wireline or wireless link. Example wireless links may include 802.11a/b/g/n, 802.20, WiMax, and/or any other appropriate wireless link. In other words, the network 114 encompasses any internal or external network, networks, sub-network, or combination thereof operable to facilitate communications between various computing components inside and outside the illustrated environment 100. The network 114 may communicate, for example, Internet Protocol (IP) packets, Frame Relay frames, Asynchronous Transfer Mode (ATM) cells, voice, video, data, and other suitable information between network addresses. The network 114 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, web server 102 includes a processor 104. Although illustrated as a single processor 104 in FIG. 1, two or more processors may be used according to particular needs, desires, or particular embodiments of environment 100. Each processor 104 may be a central processing unit (CPU), a blade, an application specific integrated circuit (ASIC), a field-programmable gate array (FPGA), or another suitable component. Generally, the processor 104 executes instructions and manipulates data to perform the operations of web server 102, often using software. Specifically, the web server's processor 104 executes the functionality required to receive and respond to HTTP requests from the client 118, as well as the functionality required to update and store information associated with the plurality of web pages 108 within memory 106. Regardless of the particular implementation, "software" may include computer-readable instructions, firmware, wired or programmed hardware, or any combination thereof on a tangible medium as appropriate. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The web server 102 also includes memory 106. Memory 106 may include any memory or database module and may take the form of volatile or non-volatile memory including, without limitation, magnetic media, optical media, random access memory (RAM), read-only memory (ROM), removable media, or any other suitable local or remote memory component. Memory 106 may store various objects or data, including classes, frameworks, applications, backup data, business objects, jobs, web pages, web page templates, database tables, repositories storing business or other dynamic information, or any other information including any parameters, variables, algorithms, instructions, rules, constraints, or references thereto relevant to the purposes of the web server 102. Additionally, memory 106 may include any other appropriate data, such as VPN applications, firmware logs and policies, firewall policies, a security or access log, print or other reporting files, as well as others.

Specifically, illustrated memory 106 includes a plurality of web page files 108 (where at least some of the web page files 108 include one or more image file references 110) and a set of image files 112. Although illustrated within memory 106, some or all of the illustrated elements may be located or stored outside of memory 106 and/or web server 102 (e.g., in multiple different memories and/or on multiple different servers, as well in other locations external to, but communicably coupled with, environment 100). For example, some or all of the set of image files 112 may be stored remotely from web server 102, and accessed separately by the client's web browser 128 based on the image file reference 110 received with the particular requested web page 108 served by the web server 102. Each web page file 108 may be stored as an HTML document, an eXtensible Hypertext Markup Language (XHTML) document, a text file, or any other suitable file type that can be processed and used by a client 118 to provide a visual representation of the web page defined by the associated web page file 108. In many situations, the web page file may include various programming languages or text implementing various formats and functions. For example, the web page file may be an HTML file that cites to a java applet, which then implements the functionality that collects the particular image or other cacheable file. In other words, each web page file may include any number of references to cacheable information and such reference may be direct or indirect as appropriate.

In addition to static content defined by its source code, each web page file 108 may include, embed, or be associated with additional dynamic content, as well as other content stored apart from the web page file 108 itself, wherein the associated content is defined as embedded within, or a part of, the web page file's 108 source code. In those instances, in addition to the web page file 108 itself, additional information or data is retrieved by the client 118 in order to provide a complete visual representation of the web page associated with the web page file 108. In the implementation described herein, some or all of the web page files 108 stored at the web server 102 include at least one image. It will be understood that in alternative embodiments, images may be replaced by any other suitable type of file, including, without limitation, video files, audio files, external scripts or applets, and other files and applications. However, for ease of description, the illustrated embodiments of FIGS. 1 through 4 will refer solely to images and image files as associated with each of the web page files 108.

Each image included or embedded within a web page is defined by an image file reference 110 included within the source code of the associated web page file 108, where the image file reference 110 defines a particular URL where the associated image is stored or located. In many instances, the associated image can be located within memory 106 within the set of image files 112, although in some instances, the image file reference 110 may point to a location or URL external to the web server 102, such that the client 118 sends its request for the image to an external system in order to retrieve the image referenced or embedded within the web page file 108.

In one example, a particular web page file 108 may be defined to include an image entitled "image.jpg." The web page file 108 itself may be associated with or located at a URL of "www.abc.com," with the associated embedded image file 112 stored locally at the web server 108. Based on its location at the same web server 102, the URL defining the location of the image (or the image file reference 110) may be defined as "www.abc.com/image.jpg," such that a request to the web server 102 for "www.abc.com/image.jpg" will return a copy of the image entitled "image.jpg" from the set of image files 112. Alternatively, the image file 112 embedded in the web page file 108 may be located at any network-addressable location outside of the web server 102. In many cases, that network address may comprise a website, microsite, or other web address. That being said, the location of the embedded image file 112 may be defined, for example, as "www.xyz.com/image.jpg," where the top-level domain of "www.xyz.com" is associated with a different server or logical location than web server 102.

In addition to the URL location of the image file 112, each image file reference 110 includes an additional parameter that uniquely defines the current version of the associated image stored at the referenced URL. For example, the additional parameter uniquely identifying the stored image 112 may be a "last modified" attribute of the image 112, defining when the image file 112 was last updated or modified. In those instances, the parameter may be defined by the date, and, in some cases, the exact time, of the last image file 112 modification. Alternatively, the unique identifier may be randomly assigned each time the image file 112 is updated or modified, such as by using a random number generator or random system entropy data collected at the time of the update or modification. In still other instances, the unique identifier or parameter may be represented as the file name of the image file 112, while in other instances, the particular version number of the image file 112 may be used. Additionally, a combination of some or all of these unique identifiers, as well as others, may be used or combined to create the unique identifier for the image file reference 110 of a particular image file 112.

To append the parameter to the image file reference 110, a placeholder value unassociated with the image's reference URL may be added in between the combined URL and generated unique parameter. In order to avoid issues with server requests including the parameter and to avoid modifying the web server's 102 processing of the URL requests, the placeholder value used by the present solution can be a question mark ("?"), as well as any other symbol or value that is ignored by the web server 102 when included in a received request for an image file 112 or web page file 108, or any symbol or value known by the web server 102 to indicate that a parameter or other non-URL information is to follow. Regardless of how the parameter is generated, the image file reference 110 can include a combination of the specific URL of the image file, the placeholder, and the unique parameter. For example, if the unique parameter defining a version of an image file 112 is "abc," then the image file reference 110 for that image file 112 will be "www.abc.com/image.jpg?abc." An updated version of the same image file 112 may be represented by the parameter of "xyz," such that the image file reference 110 of the updated image file 112 will be "www/abc.com/image.jpg?xyz." In general, the combination of the placeholder and the unique parameter may be jointly described as the parameter of the image file reference 110.

As illustrated in FIG. 1, the web server 102 may include an image file reference update module 105 for managing the image file references 110 included within each web page file 108. The image file reference update module 105 may be executed by processor 104, and may comprise any software application or module capable of monitoring the set of image files 112 for updates or modifications to one or more of the image files 112 stored therein. In one instance, the image file reference update module 105 determines when a particular image file 112 is modified, generates the unique parameter associated with the updated image file 112, and inserts or replaces the appropriate image file reference 110 into each image file reference 110 associated with the updated image file 112. For example, the image file reference update module 105 may search the plurality of web pages 108 for references to a modified image file 112, and replace the image file reference 110 previously associated with the image with a new image file reference 110 that combines the URL of the image file 112, the designated placeholder, and the parameter of the modified image file 112 that uniquely identifies the version of the image file 112 associated with web page file 108. In other words, the image file reference update module 105 modifies or updates the source code of the web page files 108 that include references to an updated or modified image file 112. In other instances, the image file reference update module 105 may work in connection with the web server 102 to generate the unique parameters for the one or more image file references 110 "on the fly," or when the web page file 108 associated with or embedding the image file reference 110 is requested by a client 118 or web browser. In these instances, some or all of the web page files 108 will be dynamically generated only upon request from a client 118, web browser, or another component or entity. In those instances, no stored web page file 108 will need to be updated at the web server 102 when image files 112 are modified. Instead, the web server 102 and image file reference update module 105 will dynamically generate both the new web page file 108 and the new image file reference 110 associated with the web page request and updated image file 112.

When the web server 102 receives a request from the client 118 for a particular web page file 108, the image file reference 110 included within the web page file 108 is sent as part of the web server's 102 response. When the client 118 requesting the particular web page 108 does not have a cached version of the updated image file 112, the web server 102 receives a second request from the client 118 for the URL defined by the combined image file reference 110 (i.e., the specific image file URL, the placeholder, and the unique parameter identifying the current image file 112). In some instances, a first web server 102 may receive the initial request for the web page file 108, while a second web server 102 may receive the request for the web page file's 108 associated image file 112 (i.e., where the image file 112 embedded within the web page file 108 is stored in a second location or web server 102 remote from the web page file 108). Because all information after the placeholder used to separate the image file URL and the unique parameter is ignored by the web server 102 (or is identified by the web server 102 as a parameter associated with the received image file URL), the server 102 simply retrieves the image file 112 identified by the image file URL and sends that image file 112 to the client 118. Since the image file 112 associated with the image file reference 110 is the current version of the image file 112, the web server's 102 response remains the same. For instance, when the client 118 requests the image URL of "www.abc.com/image.jpg?xyz," the web server 102 ignores the "?xyz" portion of the URL (or identifies that portion as a parameter associated with the URL), and returns the image file 112 located at "www/abc.com/image.jpg." In some implementations, only one version of the image file 112 is stored at the web server 102 at any particular time. In those instances, the updated image file 112 replaces previous versions of the image file 112 when the modification or update to the image file 112 is made. Therefore, only the unique parameter value associated with the image file reference 110 is updated, as opposed to the specific image file URL.

The illustrated environment of FIG. 1 also includes one or more clients 118. Each client 118 is any computing device operable to connect or communicate at least with the web server 102 and/or the network 116 using a wireline or wireless connection. Further, each client 118 includes a processor 120, an interface 122, a graphical user interface (GUI) 128, and a memory 130. In general, the client 118 comprises an electronic computing device operable to receive, transmit, process, and store any appropriate data associated with the environment 100 of FIG. 1. It will be understood that there may be any number of clients 118 associated with environment 100, as well as any number of clients 118 external to environment 100. For example, while illustrated environment 100 of FIG. 1 includes three clients (118a, 118b, and 118c), alternative implementations of environment 100 may include a single client 118 communicably coupled to the web server 102, while other implementations may include more than the three clients 118. There may also be one or more additional clients 118 external to the illustrated portion of environment 100 that are capable of interacting with the environment 100 via the network 116. Further, the term "client" and "user" may be used interchangeably as appropriate without departing from the scope of this disclosure. Moreover, while each client 118 is described in terms of being used by one user, this disclosure contemplates that many users may use one computer or that one user may use multiple computers. As used in this disclosure, client 118 is intended to encompass a personal computer, touch screen terminal, workstation, network computer, kiosk, wireless data port, smart phone, personal data assistant (PDA), one or more processors within these or other devices, or any other suitable processing device. For example, each client 118 may comprise a computer that includes an input device, such as a keypad, touch screen, mouse, or other device that can accept information, and an output device that conveys information associated with the operation of the web server 102 or the client 118, including digital data, visual information, or the GUI 128. Both the input device and the output device may include fixed or removable storage media such as a magnetic computer disk, CD-ROM, or other suitable media to both receive input from and provide output to users of the clients 118 through the display, namely the GUI 128. As indicated in FIG. 1, client 118c is specifically associated with an administrator of the illustrated environment 100. The administrator associated with client 118c can modify various settings associated with one or more of the other clients 118 (including one or more browser settings 132 associated with each client 118), web server 102, and/or any suitable portion of environment 100. For example, the administrator of client 118c may be able to modify the cache timeout values associated with web browsers within each of the clients 118, as well as any settings associated with the image file reference update module 105, such as the format and style of the parameters generated to uniquely identify the various image files 112 stored at the web server 102.

The interface 122 of each client 118 may be similar to interface 114 of the web server 102 in that it may comprise logic encoded in software and/or hardware in a suitable combination and operable to communicate with the network 116. More specifically, interface 122 may comprise software supporting one or more communication protocols such that the network 116 or hardware is operable to communicate physical signals to and from the client 118.

Similarly, memory 130 of each client 118 may be similar to memory 106 of the web server 102, and may include any memory or database module and take the form of volatile or non-volatile memory including, without limitation, magnetic media, optical media, random access memory (RAM), read-only memory (ROM), removable media, or any other suitable local or remote memory component. For example, memory 130 may store backup data, parameters, cookies, variables, algorithms, instructions, rules, or references thereto, as well as any other suitable data. As illustrated, memory 130 includes a set of browser settings 132, a web cache 134, and an image file cache 136, each of which will be described below.

The GUI 128 comprises a graphical user interface operable to allow the user to interface with at least a portion of environment 100 for any suitable purpose, including generating a visual representation of the one or more web page files 108 received by the client 118 from the web server 102, as well as to allow users at each client 118 to view those visual representations. Generally, the GUI 128 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 128 can be any graphical user interface, such as a web browser, touch screen, or command line interface (CLI) that processes information in the environment 100 and efficiently presents the results to the user. In general, the GUI 128 may include a plurality of user interface (UI) elements such as interactive fields, pull-down lists, and buttons operable by the user at the client 118. These UI elements may be related to the functions of one or more applications executing at the client 118, such as a business application or the web browser associated with the GUI 128. In particular, the GUI 128 may be used in connection with the web browser associated with the GUI 128 to view and navigate to various web pages, some of which may be associated with (or the visual representation of) the web page files 108 stored in and associated with the web server 102 (as illustrated in FIG. 1). For purposes of the present disclosure, the term "web browser" and "GUI" may be used interchangeably, such that the GUI 128 may be referred to as the "web browser 128."

In some instances, the GUI 128 (or the web browser 128) is a software application which enables the client 118 (or a user thereof) to display and interact with text, images, videos, music, and other multimedia files and information typically located in web page files received from one or more web servers (i.e., web server 102), or other computers accessible via the network 116, such that they can be cached. Text and images embedded within web pages displayed by the web browser 128 can contain hyperlinks (or other logical network addresses) to other web pages or web page files 108, with some of those web page files associated with different web servers and domains than the web page containing the hyperlink. Users of client 118 can quickly and easily access information associated with the various web pages by navigating those links using the web browser 128. Additionally, one or more of the web page files 108 received by client 118 may include one or more image file references 110 as described above, which, when included with the web page file 108 returned to the client 118, can cause the web browser 128 to send one or more additional requests to the web server 102 (or other location specified by the particular image file reference 110) to retrieve the referenced image file 112. In general, the web browser 128 formats web page files stored as HTML documents, XHTML documents, text files, or any other suitable files for display via the GUI 128, so the visual appearance of a particular web page file 108 may differ between browsers, based on the browser associated with the GUI 128 and the settings defined by or for the user (i.e., by the user on the user's client 118 or by an administrator associated with one or more of the client 118c). As illustrated in FIG. 1, the web browser 128 can connect to the web server 102 via the network 116. Example web browsers 128 may include Microsoft's Internet Explorer, Mozilla's Firefox, Apple's Safari, Opera Software ASA's Opera browser, and Google's Chrome, as well as any other suitable browser. In certain implementations, the web browser 128 may be associated with, or may be a portion or module of, a business application, providing web browser or similar web page file processing and visualization functionality to the application.

The web browser 128 (or GUI 128) is associated with several elements stored in memory 130 of each client 118, including a set of browser settings 132, a web cache 134, and a set of cached image files 136. The set of browser settings 132 defines one or more settings associated with web browser 128, including the browser's cache timeout setting. As previously described, the cache timeout setting determines when the web browser 128 will send requests to the web server 102 to obtain updates for the files cached at the client 118 (i.e., cached image files 136). The web cache 134 is a portion of memory 130 associated with the web browser 128 that stores some or all of the web documents (e.g., web page files 108, image files 112, and other cacheable web documents) received by the web browser 128 from interactions with the web server 102 and other components both within and external to environment 100 via network 116. Additionally, a portion of the web cache 134 may be a set of cached image files 136 specifically associated with the one or more image files 112 retrieved from the web server 102. The web cache 134 generally, and the set of cached image files 136 specifically, store the cacheable web documents along with a listing of the URL associated with the particular web document. In other words, when the web page "www.abc.com" is requested and received for the first time, web browser 128 stores a cached version of the web page file 108 defining the requested web page in the web cache 134 along with a reference specifically associating the cached version with the web page of the URL "www.abc.com." Similarly, the set of cached image files 136 stores the various image files retrieved and received by the web browser 128, along with a distinct reference as to the image file reference 110 included or associated with the server request. Thus, as previously described, when the web server 102 provides a web page file 108 associated with a particular image file 112 to the web browser 128, the web page file 108 embeds or includes a particular image file reference 110 comprising not only the specific image URL, but also the defined placeholder and unique parameter identifying the current version of the image file 112. Once the web page file 108 is received and processed by the web browser 128, the web browser 128 can send a request to the web server 102 for the image file reference 110 received with the web page 108. In other words, the request for the image file includes the image URL and the appended unique parameter, such that an example request from the web browser 128 for a particular image file 112 is "www.abc.com/image.jpg?abc." The web cache 134, upon receiving the appropriate image file 112 from the web server 102 in response to the web browser's 128 request, stores the retrieved image file 112 in the set of cached image files 136 and references that particular image file 112 using the image file reference 110 used in the server request. Thus, the image file 112 returned from the web server 102 can be referenced in the web cache 134 by the value requested, in this case, "www.abc.com/image.jpg?abc."

Further, when the web browser 128 sends a second, later request for the same web page to the web server 102, the web server 102 again sends a copy of the associated web page file 108 to the web browser 128. After this request, however, some or all of the web page file 108 may be cached at the client 118 such that additional server requests for the embedded, cacheable elements of the web page 108 may not be necessary. In those instances, elements stored in the web cache 134 can be retrieved by the client 118 or the web browser 128 instead of requiring the client 118 or web browser 128 to send an additional browser request to the web server 102 (and then wait for the associated server's response to the request), thus reducing the number of server requests necessary to present the complete visual representation of the web page file 108.

In some instances, however, one or more cached elements stored at the client 118 may have been updated at the web server 102 since the previous request for the same web page. For example, the image file 112 associated with the web page file 108 may have been modified at the web server 102 since the last request and receipt of the web page file 108. As described in the present disclosure, the image file reference 110 allows the web browser 128 to determine whether or not the image file 112 has been modified, and thus, whether the web browser 128 should send a request to the web server 102 for the updated image file 112. To determine whether such a request is necessary, the web browser 128 processes the web page file 108 received in response to the second request as normal, including determining whether the web page file 108 includes an image file reference 110 defining an image file 112 associated with or embedded within the web page 108. The particular image file reference 110 included in the newly received web page file 108 is then compared to the set of cached image files 136 within the web cache 134 to determine whether the version of the image file 112 identified by the image file reference 110 is stored with the set of cached image files 136. As described above, the image file reference 110 includes a unique parameter defining the current version of the image file 112 which can be dynamically updated as newer versions of the image file 112 are created or stored at the web server 102. The web browser 128 then compares the image file reference 110 received with the set of cached image files 136 to see if the current version of the image file 112 is available within the client's cache. If the image file reference 110 associated with the initial version of the image file 112 was "www.abc.com/image.jpg?abc," then a second image file reference 110 received in response to the second request having a different unique parameter will indicate to the web browser 128 that a newer version of the image file 112 is available, because the web browser 128 will not find a cached image file 136 with an image file reference 110 matching the image file reference 110 received after the second request. For instance, if the second image file reference 110 is "www.abc.com/image.jpg?xyz," then the web browser 128 will not find its match in the web cache 134, as the first image file reference 110 was "www/abc.com/image.jpg?abc." Therefore, the web browser 128 will send a new request to the web server 102 (or another location defined within the new image file reference 110) requesting the updated image file 112. However, if the second image file reference 110 is the same as an image file reference 110 previously received and stored by the client 118 (e.g., "www.abc.com/image.jpg?abc"), then the web browser 128 will find the image file 112 in the set of cached image files 136 associated with the received image file reference 110. Therefore, no additional server requests are necessary, and the appropriate image can be retrieved from the web cache 134 and included within the visual representation of the requested web page file 108 at GUI 128.

While FIG. 1 is described as containing or being associated with a plurality of components, not all components illustrated within the illustrated implementation of FIG. 1 may be utilized in each alternative implementation of the present disclosure. Additionally, one or more of the components described herein may be located external to environment 100, while in other instances, certain components may be included within or as a portion of one or more of the other described components, as well as other components not described. Further, certain components illustrated in FIG. 1 may be combined with other components, as well as used for alternative or additional purposes in addition to those purposes described herein.

Figure 2:
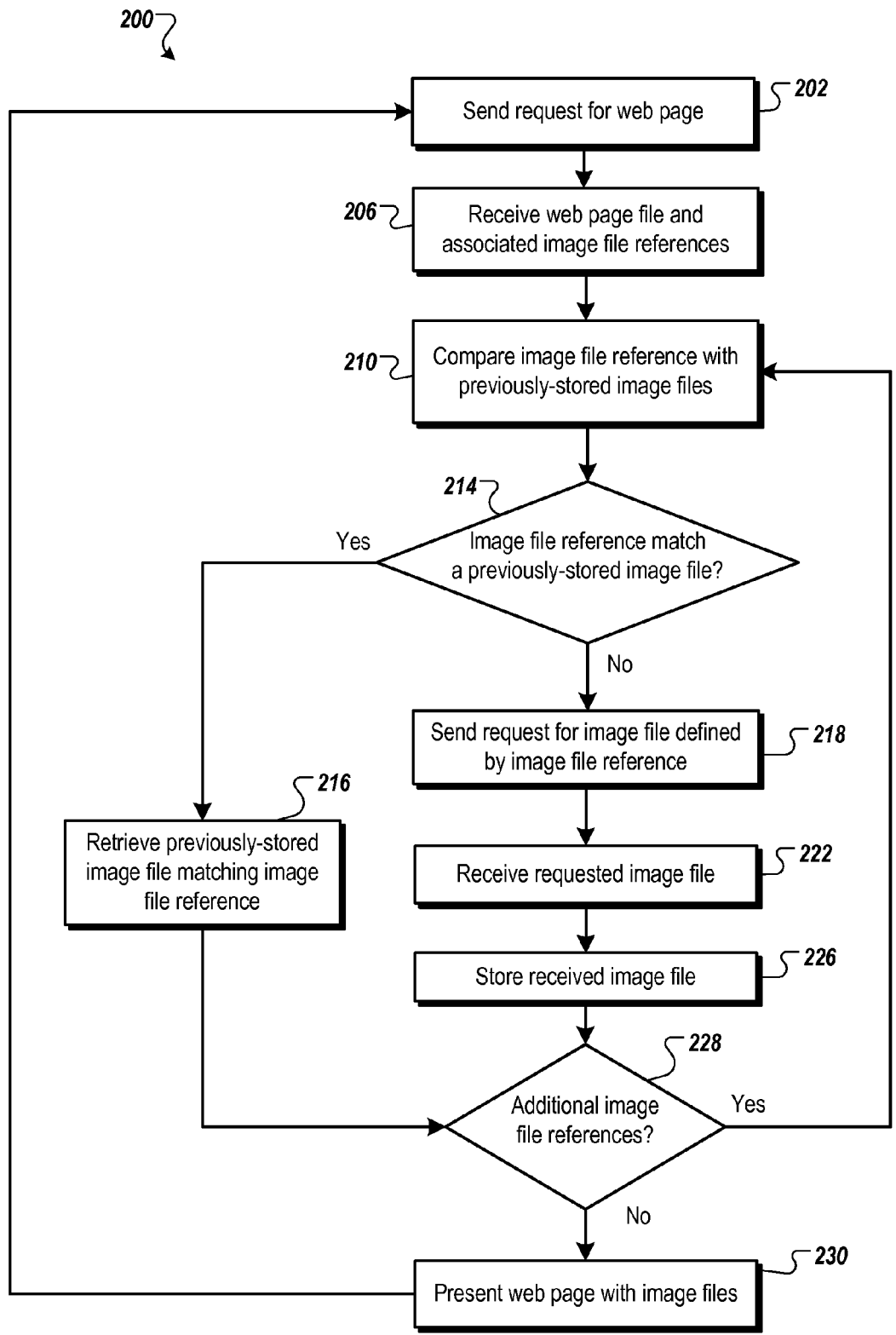
FIG. 2 is a flowchart illustrating an example method for reducing the number of server requests made by the client from the perspective of the client using an appropriate system, such as the system described in FIG. 1.

FIG. 2 is a flowchart illustrating one particular implementation of a method 200 for reducing the number of server requests sent by the client from the client's perspective. For clarity of presentation, the description that follows generally describes method 200 in the context of environment 100 illustrated in FIG. 1. However, it will be understood that method 200 may be performed, for example, by any other suitable system, environment, or combination of systems and environments as appropriate.

At 202, the client sends a request for a web page. In some instances, the request for the web page may be sent by a web browser associated with the client, such as web browser 128 associated with client 118 in FIG. 1. Further, the request itself may be sent to one or more web servers communicably coupled to the client, such as web server 102 illustrated in FIG. 1. In some instances, the web page request can be sent as an HTTP request, requesting from the web server a web page associated with a particular URL. The URL of the requested web page may be manually entered by a user of the client (into the associated web browser), while in other instances, the web page may be requested after the activation of a hyperlink activated while at a different web page or website within the web browser or by one or more processes of an application running at the client.

At 206, the web page file is received in response to the client's request, along with one or more image file references associated with the requested web page. In the present example method 200 is described as receiving a single image file reference associated with the web page file. However, each web page file may be associated with more than one image file reference, such that various portions of method 200 may be performed two or more times according to the number of image file references received at 206. Each image file reference defines a particular image file to be included within the visual representation of the requested web page. In some instances, the web page file received in response to the client's request may be a web page file 108, such as an HTML document, that includes a single image file reference 110 as illustrated in FIG. 1. The received web page file 108 provides the content and formatting of the requested web page that will be displayed via the GUI 128), as well as the location within the web page where the image file 112 associated with the image file reference 110 should be displayed. In one implementation, the image file reference 110 received with the web page file 108 can include a reference to the location at which the associated image file is stored (i.e., the URL defining the location of the image file at web server 102), as well as a unique parameter defining the current version of the image file 112 (e.g., a second instance of the image file's name, a timestamp associated with the image file's last update, or a version number or identifier of the image file 112 currently stored at the web server 102). Specifically, the image file reference 110 may comprise a combination of the URL of the associated image file 112, a placeholder denoting the end of the URL and the beginning of a unique identifier (i.e., a "?" or another suitable character), and the unique image parameter defining the current version of the image file 112 stored at the web server 102. For example, the image file reference received with the web page at 206 may be represented as "www/abc.com/image.jpg?abc," wherein "www.abc.com/image.jpg" represents the specific URL of the image file, the question mark ("?") represents the placeholder separating the URL and the version identifier of the image file or an indication of the beginning of the unique parameter, and "abc" represents the parameter uniquely identifying the current version of the image file stored at the web server. The parameter included within the image file reference can define the current image file version in any suitable manner. For instance, the parameter may be or include a "last modified" attribute of the current image file version (e.g., xxyyzzzz, where "xx" represents the month, "yy" represents the day, and "zzzz" represents the year when the associated image file was last modified or updated). Further, the parameter can include or be a randomly or quasi-randomly generated number, such that the parameter provides a uniquely identifiable character string or value associated with or defining the current version of the image file. In those instances, for example, a unique random (or quasi-random) value can be used to define the current image version. Any other type of parameter capable of uniquely identifying each version of the image file is contemplated, and may be used in various implementations.

At 210, the client compares a first image file reference received with the returned web page with a plurality of image files previously-stored at the client. For example, the client (or its associated web browser) may store a plurality of previously-received images within its local memory. As illustrated in FIG. 1, the client 118 stores the plurality of cached image files 136 in a web cache 134. Each of the cached image files 136 may be linked (or referenced) to the image file reference 110 associated with the particular cached image file. In some instances, a table or list of the image file references 110 associated with each of the cached file images 136 may also be stored at the client 118. In some instances, the client 118 may access the web cache 134 using the functionality of the web browser 128 to determine whether the image file reference 110 received at 206 matches or is associated with any of the previously-received (and cached) image files 136 stored at the client 118. In some instances this comparison may be performed by comparing the image file reference 110 received at 206 with the various image file references 110 associated with the set of cached image files 136 previously received from the web server 102. For example, the client 118 (using, for instance, the web browser's 128 functionality) may search a table or list of image file references 110 previously received by the client 118, wherein each of the image file references 110 are associated with a particular cached image file 136, to determine whether the image file 112 associated with the image file reference 110 received at 206 is included within the web cache 134. In some instances, all of the cached image files (and their associated image file references) stored at the client may be compared to the image file reference received at 206, while in other instances, only a portion of the cached image files may be included within the comparison. In one example, only cached image files associated with image file references having the same top-level domain of the URL identified by or included with the received image file reference are compared at 210. By limiting the number of cached image files that are compared to the image file reference received at 206, method 200 may maximize the benefits of the present disclosure while avoiding excessive and unnecessary searching at the client.

At 214 the client determines whether or not the image file reference received with the web page at 206 matches any of the previously-stored image files (or image file references) located at the client. Specifically, the client (or its web browser) determines whether the particular version of the image file defined by the image file reference is stored locally (i.e., in a web cache), and thus, available to the client without requiring an additional server request for the image file. In some instances, the client will only determine that the version of the image file specified by the image file reference received at 206 is locally available at the client if the image file reference received at 206 exactly matches an image file reference associated with one of the previously-stored image files. Any difference between the image file reference received at 206 and the image file reference associated with the cached image file will result in a failed match.

If the client determines that the current version of the image file uniquely identified by the received image file reference is locally available at the client, then method 200 continues at 216, wherein the cached image file matching the current version specified in the received image file reference is retrieved from the appropriate local location (i.e., from within the client's cache). In some instances, the client's web browser (e.g., web browser 128 of FIG. 1) may retrieve the identified image file from the web cache. In these instances, no additional server requests are necessary to present the requested web page in its entirety, as the current version of the image file stored at the web server is already available at the client. Thus, method 200 avoids unnecessary requests to the web server without sacrificing the determination or information that the locally available cached version of the image file is outdated or has been updated at the web server. Once the cached image file has been retrieved, method 200 continues at 228, wherein the client determines if the received web page file includes any additional image file references.

If, however, the client determines at 214 that the image file reference received at 206 fails to match any of the previously-stored image files, then method 200 continues at 218, where the client sends a request for the image file defined by the received image file reference. In other words, the client can send a request (e.g., an HTTP request) associated with the URL identified in the image file reference received at 206 to retrieve the image file. In the implementation of FIG. 1, the client 118, using the web browser 128, may send the request to web server 102 via the network 116 requesting the image file 112 identified by the image file reference 110 received at 206. In some instances where the image file reference received at 206 comprises a URL, placeholder, and unique parameter, the client can send the entire image file reference within the request sent at 218. In other instances, the client may parse the image file reference and only send the image file URL portion of the image file reference.

At 222, the client receives the requested image file. In some instances, the requested image file may be received in a response (e.g., an HTTP server response) sent from the web server associated with the location defined in the image file reference. Additionally, the web server sending the response may be the same web server that provided the web page and image file reference at 206. After receiving the image file at 222, the client stores the received image file in a local storage at 226. As illustrated in FIG. 1, the received image file 112 may be stored in the web cache 134 along with the other cached image files 136. In some instances, the new version of the image file received at 222 may overwrite previous versions of the image file that were previously stored in the client's cache. In other instances, the image file received at 222 may be the first version of the image file received by the client, in which case the image file is simply stored in the client's cache (or other local memory). Further, when storing the new version of the image file, the client may associate the unique image file reference received at 206 with the new, cached version of the image file. As previously described, this association may be created directly with the stored version of the image file, or via a table or list of image file references with links or defined associations to the set of cached image files stored at the client. By associating the newly stored image file with its unique image file reference, in later iterations of method 200 the client can quickly determine (at 210 and 214) whether the image file references received at 206 match any of the stored image files. Once the received image file (and associated image file reference) are stored, method 200 continues at 228.

At 228, the client determines whether any additional image file references are embedded within or associated with the received web page file 108. If additional image files references remain to be processed, method 200 returns to 210, where the next image file reference is compared to the cached image files to determine whether the next image file is locally available or needs to be requested from the location specified in the received image file reference. If no additional image file references remain, then method 200 continues at 230.

At 230, whether the client has either retrieved the appropriate image file(s) from its local storage (at 216) or from the specific location identified within the image file reference(s) received at 206 (using the steps of 218, 222, and 226), or a combination of thereof, the client presents the requested web page along with the current versions of each image file embedded within the web page file received at 206. For example, in FIG. 1, the web page 108 and its embedded image files defined by its image file references 110 can be visually represented by the GUI 128 and displayed to the client's 118 users. If the client later requests the same web page, method 200 returns to 202 where the process beings again. In those instance, if all of the image files associated with the web requested page have not been modified since the previous request, then the client will determine that the most current image files are locally available, retrieving them from the client's cache and not sending a request (or requests) for the updated version(s) of the image files to the associated web servers. However, if one or more of the image files associated with the requested web page have been modified since the previous request was received and processed, client will not locate the updated image file references in local storage and will send additional requests for the updated image files.

Figure 3:
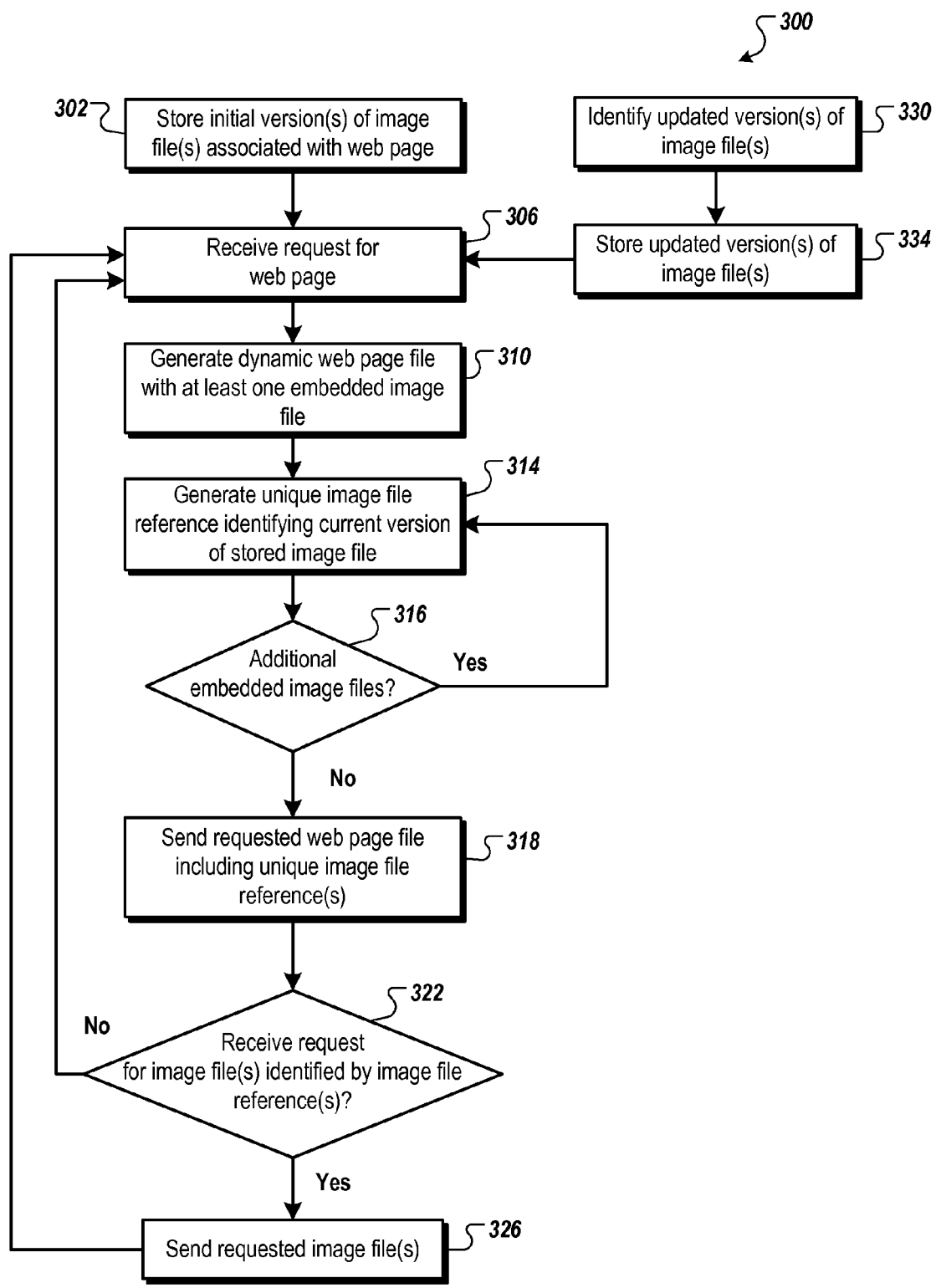
FIG. 3 is a flowchart illustrating an example method for reducing the number of server requests made by the client from the perspective of a web server using an appropriate system, such as the system described in FIG. 1.

FIG. 3 is a flowchart illustrating one example method 300 for reducing the number of server requests made by the client from the perspective of a web server. For clarity of presentation, the description that follows generally describes method 200 in the context of environment 100 illustrated in FIG. 1. However, it will be understood that method 300 may be performed, for example, by any other suitable system, environment, or combination of systems and environments as appropriate.

At 302, the web server stores an initial version of an image file (or image files) associated with a web page. In some instances, the image file may be created or generated on or by the web server, as well as received (or uploaded) from a user, client, application, or other entity via a network connection associated with the web server. In some instances, a web developer or other user associated with the web page may manually store the image file to the web server, while in other instances, the image file may be stored at the web server prior to the creation of the web page, and be associated with the web page when the web page is created or designed later.

At 306, the web server receives a request for a web page. The request may be received from a client (or another computer or system) associated with the web server via the web server's network connection (e.g., network 116). In many cases, the request for the web page will be received as an HTTP request from a web browser associated with the client.

In response to the request, the web server generates a dynamic web page file with at least one embedded image file at 310. For example, the request for the web page can initiate a dynamic web page generation process at the web server that results in a newly created or updated web page file associated with the received request. The dynamically generated web page file can include or be associated with at least one embedded image file within the source code. In some instances, the dynamic web page generation process may result in HTML or other suitable code being generated for the requested web page file, with each generated web page file including a reference to at least one image file associated with the web page file. In some instances, the requested web page may instead be associated with a previously generated and/or stored version of a web page file, and may not be dynamically generated at 310. Instead, at 310 the web server may retrieve the requested web page file for further processing according to method 300. In those instances, the stored web page file 108 may be embedded or associated with one or more image files.

At 314, the web server generates a unique image file reference identifying the current version of the stored image file associated with the requested web page. The image file reference may be generated automatically when the image file is created, modified, updated, or added at the web server. Additionally, the image file reference may be generated simultaneously (or sequentially) with the web page generation of 310. In some instances, the image file reference may be generated by a specific application at the web server, while in other instances, the image file reference may be manually generated by the user adding the document to the web server. In the illustrated implementation of FIG. 1, the image file reference update module 105 generates the unique image file reference for each new, updated, and modified image file 112. In illustrated method 300, the image file reference update module 105 determines the appropriate image file reference 110 when the web page file associated with the requested web page is dynamically generated. In other instances, the image file reference update module 105 may monitor the image files 112 within memory 106 to determine when a new image file is added, or when a previously stored image file 112 is modified. In some instances, the image file reference update module 105 will automatically update any image file reference 110 associated with a particular image file 112 within one or more of the persistent web pages 108 stored at the web server 102 in response to a modification or update to the particular image file 112. In implementations where web page files are dynamically generated after receipt of a web page request, the image file update module 105 can provide or generate the appropriate image file references 110 in tandem with the dynamic web page generation process.

In one example, the image file reference is created from a combination of the location where the file is stored, a placeholder denoting the beginning of the version identifier, and the unique version identifier parameter. As the web server is connected to a network (such as network 116), and in some cases, the Internet, the location of the file may be based on a domain name associated with the web server and/or the web page associated with the image file. In general, the location of the file represents a network-addressable location, where the associated image file may be retrieved. For instance, if the web server is associated with the domain name "www/abc.com," then an image file named "image.jpg" in the default directory of the web server may have the generic URL of "www.abc.com/image.jpg." In other instances, the location of the file may be specified by a specific IP address associated with the web server, image server, cache server, or other computer storing information for use by a web page file. In most instances, the location of the file can be expressed in a manner that allows clients, web browsers, and users associated with network 116 to access the file in a simple manner. The placeholder portion of the image file reference can be any character or set of characters that, when sent to the web server in a request, is ignored when processing the request. In one example, the web server may be configured to ignore portions of web addresses following and including a question mark ("?"). Alternative characters and string values may also be used to separate the image file's URL from information regarding the image file's version. The web server settings may be adjusted or set to allow any suitable character or combination of characters to act as a placeholder in accordance with method 300. Next, the image file reference may include a parameter, string, or identifier allowing different versions of the image file to be uniquely identified. As previously described, in one example the "last modified" attribute of the image file may be used to create a unique image file reference. Additionally, random or quasi-random numbers may be used to uniquely identify a particular file. Still further, users or applications providing the image file to the web server may include a particular parameter or identifier to be used in the creation of a unique image file reference. In the present disclosure, a generic identifier of "abc" and "xyz" will be used to generally describe two different versions of a particular image file. The strings of "abc" and "xyz" can represent any combination of letters and/or numbers, as well as fewer or additional characters than illustrated (e.g., a single character parameter or a 100 character parameter). In some instances, the unique identifier of the image file may not be created until the image file is included within or associated with a particular web page, such as in 310.

The unique image file reference generated at 314 that identifies or defines a particular image file may further be embedded into the requested (and, in some cases, dynamically generated) web page file. The image file reference may be embedded into the web page file during or directly after the dynamic web page file generation of 310. Alternatively, where the web page files are persisted at the web server, image file references can be embedded in or added to the web page files during the initial development or definition of the web page files, or during an update, redesign, or modification to the web page files. Specifically, the image file reference is included or embedded in a portion of the web page file's code that is processed by a web browser or application at a client upon receipt of the web page file. In some examples, the web page file may be stored as an HTML document. In those instances, the image file reference may by included, for instance, within an image tag, such that an example portion of the HTML code may read "<img src=www.abc.com/image. jpg?abc>". Alternatively, if the web page is stored as an XHTML document, the image tag may read "<img src= www.abc.com/image.jpg?abc/>". Other appropriate methods of embedding or inserting the image file reference into the web page file's code may be used.

In some instances, where web page files are persisted or stored at the web server, the image file reference update module 105 may be used to embed updated image file references into their appropriate locations within one or more of the stored web page files. With reference to FIG. 1, if a first web page file 108 initially includes an image file reference 110 to a first version of a particular image file (e.g., "www.abc.com/image.jpg?initialdate"), and the image file "image.jpg" is later updated or modified, then the image file reference update module 105 may generate a new, unique image file reference 110 identifying the new version of the image file (e.g., "www.abc.com/image.jpg?newversiondate") at 306, and then embed or insert the updated image file reference 110 into each of the web pages 108 where the image file 112 is referenced. After embedding the unique image file references into the web page files stored at the web server, when those web page files are requested by and provided to clients, additional requests for the image files associated with the image file references may be received by the web server. Where a particular image file is initially associated with a web page, the image file reference may be embedded into the source code of the web page file. However, if an image file reference to a particular image file is already included within the web page file, then at 314, the image file reference may instead be updated to reflect the unique image file reference identifying the modified image file.

At 316, method 300 determines whether any additional image files are included with or embedded within the web page file. If additional image files remain to be included in the web page file, then method 300 returns to 314 wherein a unique image file reference identifying the current version of the stored image file is generated and subsequently embedded within the web page file. On the other hand, if all image files have been processed by the method 300 (i.e., each image file included within the web page file is associated with a unique image file reference generated at 314), then method 300 continues at 318. At 318, the web server responds to the request for the web page (of 306) by sending a copy of the requested (and, in some instances, dynamically generated) web page file to the requesting client or entity. Included with the web page file sent to the client or requesting entity is the unique image file reference (or references) contained or embedded within the web page file's source code (e.g., HTML code).

At 322, method 300 determines whether the web server receives a request for the image files identified by the image file references included with the web page file sent at 318. Generally, the web server will receive requests for the image files from clients that do not have a copy of the latest versions of the image files stored (or cached) locally at the client. Alternatively, requests for the image files may be received from systems without active caching mechanisms. Similar to the request for the web page at 306, the requests for the image files may generally be in the form of an HTTP request or requests directed to the URL defined by the image file reference. If no requests for the image files identified by the image file references are received, method 300 returns to 306 where it waits for another request for the web page. However, if one or more requests for the image files associated with the image file references of the web page are received at 322, the web server sends a copy of the requested image files (i.e., the most current version of the image file) to the requesting entity at 326. The requested image files may be sent to the requesting entity using an HTTP response message, as well as any other suitable method. In some instances, when interpreting the requests for the image files, the web server will disregard the placeholder and the unique parameters identifying the current versions of the image files as received from the requesting entity. In other instances, the portions of the image file references including and after the placeholder will be recognized by the web server as parameters associated with the requests for the image files. Generally, the web server's response is unaffected by the addition of the placeholders and parameters, and the web server therefore responds only to the URL portion of the request. Once the requested image files have been sent to the requesting entity, method 300 continues at 310.

At 330, the web server identifies an updated version of at least one of the image files. An updated version of a particular image file can be identified at any time after an initial version of the particular image file is stored at 302. For example, in a first iteration of method 300, a first version of the image file may be stored at the web server at 302, a request for the associated web page may be received at 306, and a dynamic web page and unique image file reference associated with the first image file version may be generated at 310 and 314 (respectively), before an updated version of the image file is identified. In some instances, the first (or previous) version of the image file may not have been a part of a requested web page (at 306) by the time an updated image file is identified. These instances may occur in systems or environments when image files are constantly updated with new information such that different versions of the image file are created at or provided to the web server.

Identifying an updated version of the image file may comprise receiving a new version of the image file from an external component or entity associated with the web server, while in other instances the image file may be modified or updated at the web server itself. Additionally, new versions of the image file may be provided or uploaded to the web server via a file transfer protocol (FTP) transaction, or the image file may be received (in some cases, automatically) from an application associated with the web server via a network connection to the web server. In some instances, the image file may be manually updated or modified by a user or developer working at or communicably coupled to the web server. In some instances, modifications and updates to the image file may include minor changes to the file including changes to the size of or parameters associated with the image file. In other instances, a new or different image file may be used in place of the previous version of the image file. Once the updated version of the image file is identified, the updated version of the file is stored at the web server at 334. For example, the new or updated version of the file can be stored in the same location of the previous file (e.g., the new or updated file can be stored in the previously referenced location of "www.abc.com/image.jpg"). In other words, the previous version of the image file may be overwritten or replaced by the new version of the image file, such that future requests to the URL of the previous version of the image file will then be associated with the new or updated image file. Once the new or updated file is identified and stored at the web server, method 300 returns to 306.

As previously described, the web server receives the request for the web page at 306. The process described in 306 through 322 is performed again, with the exception that the updated version of the image file is used in place of the initial (or previous) version used in the web page. To do so, the web page file is generated again at 310, and the unique image file reference identifying the current version of the stored image file is generated at 314, wherein the current version of the image file is now the updated version of the image file updated and stored at 330 and 334. Once each of the image file references embedded in the web page file have been generated, the web server sends the requested web page file at 318, and determines whether requests for the updated image files identified by the updated image file references are received. As an example, when a new or modified version of the image file is stored at 330, the web server generates a new image file reference uniquely identifying the newly stored version of the image file at 314.

As previously described, a portion of the unique image file reference for the updated image file will include the same URL as the previous version of the image file (and in most cases, the same placeholder defining the separation between the location of the image file and the unique image file version identifier). However, after the update, the unique parameter will be changed to uniquely identify the updated version of the image file. As described above, the unique parameter may define the time or date of the image file modification, or another suitable indication that the image file has been updated. As a general example, the image file reference for the earlier version was "www.abc.com/image.jpg?abc," while the new image file reference may be "www.abc.com/image.jpg?xyz." Again, the parameters "abc" and "xyz" can be any string or other identifier that can be used to uniquely identify the new version of the image file. Once the new image file reference is generated at 314, it may be inserted into or embedded within the web page associated with the image file. In some instances, the insertion step may comprise a simple replacement of the previous image file reference with the new image file reference. As described above, the image file reference update module 105 of FIG. 1 can be used to automatically propagate any changes to the image file references 110 associated with persistent web pages 108 stored at the web server 102, or instead can be used to generate the unique image file reference simultaneously or in connection with the generation of the web page at 310. Alternatively, individual users and developers may manually modify the image file references included in one or more of the web pages to reflect the updated version of the image file. Once the image file references have been updated at 314, method 300 continues its normal processing.

Figure 4A:
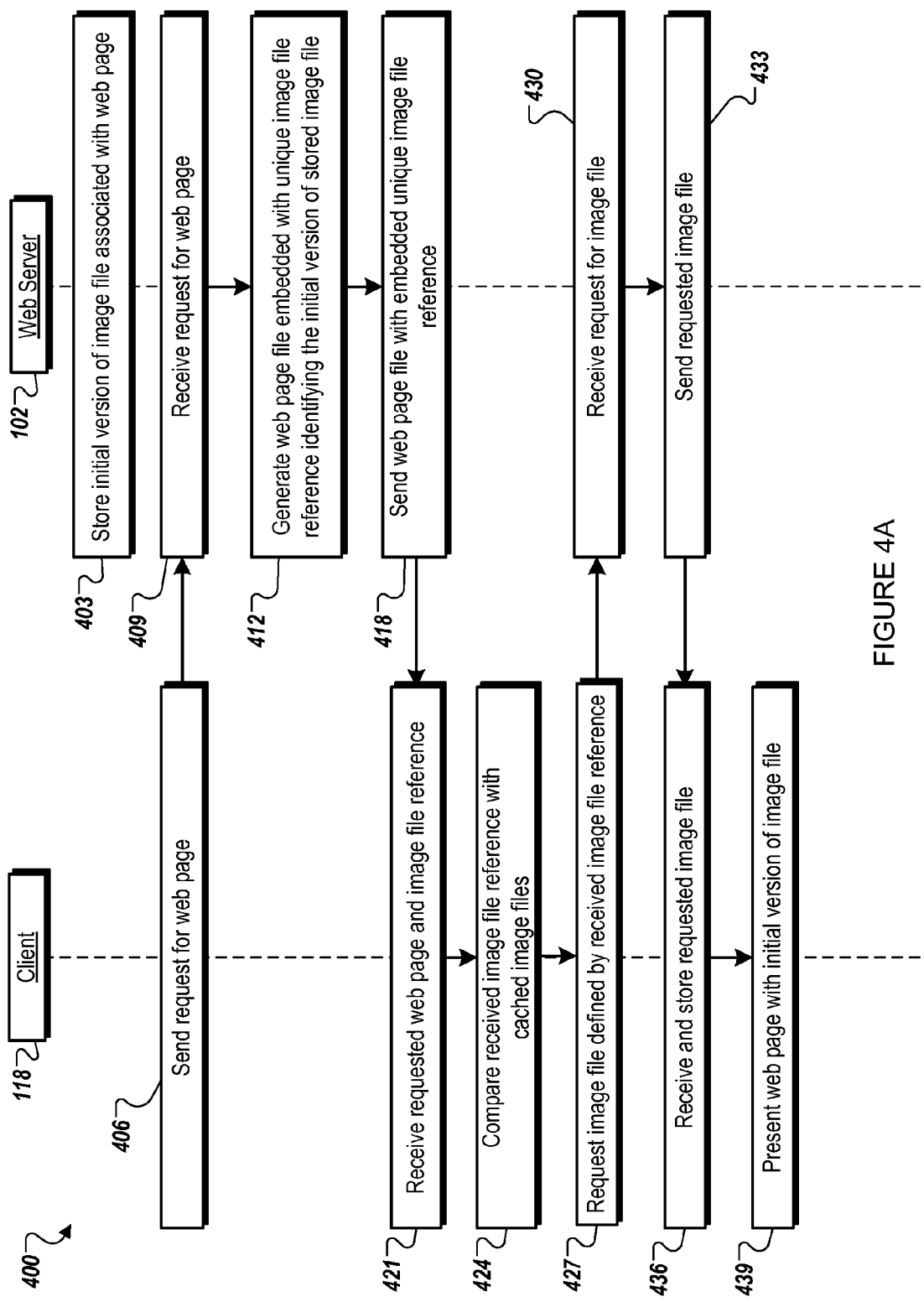
FIGS. 4A-C are example signaling and flow diagrams illustrating several possible interactions between the client and the web server used to reduce the number of server requests made by the client in accordance with the example environment of FIG. 1.
Figure 4B:
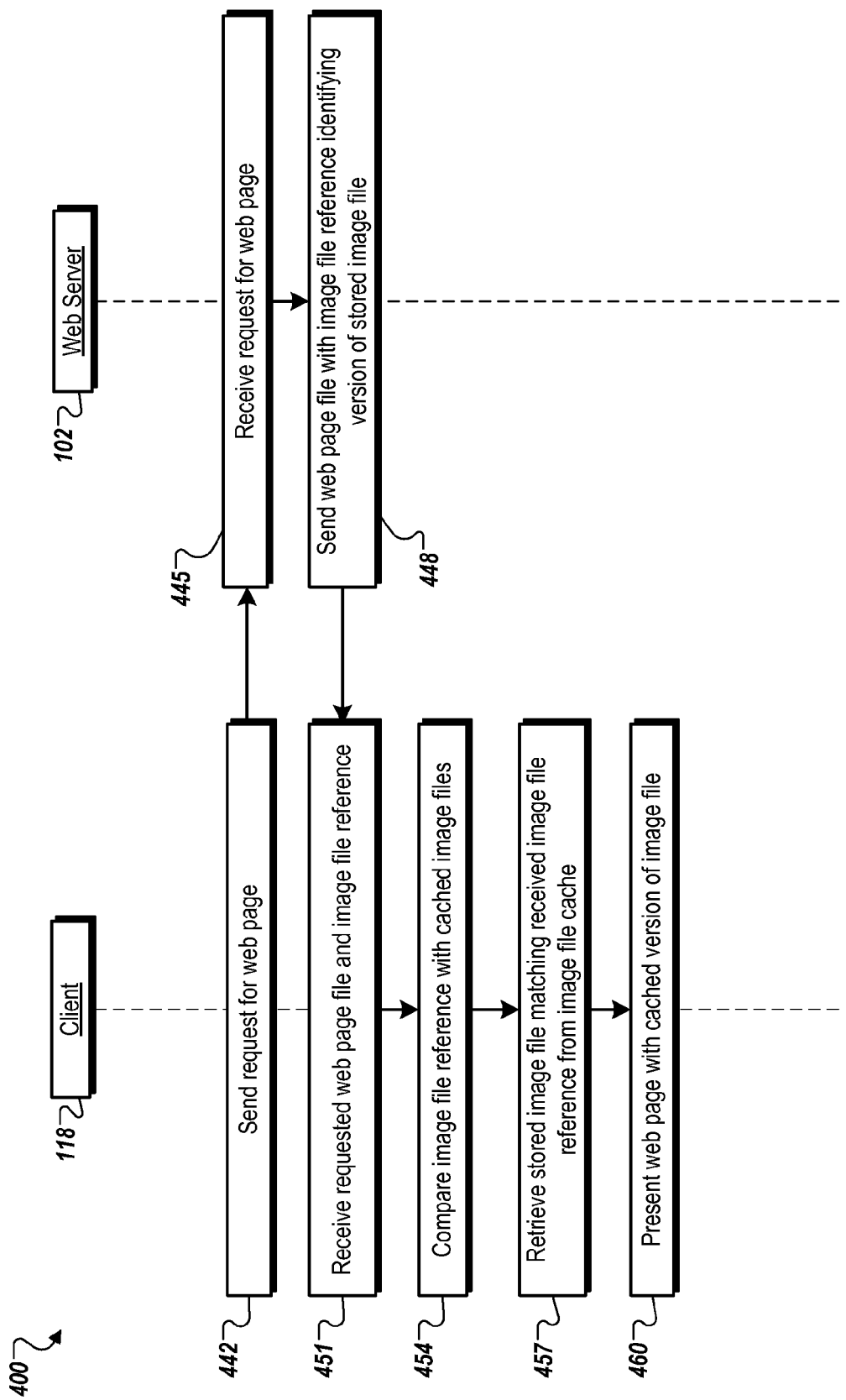
Figure 4C:
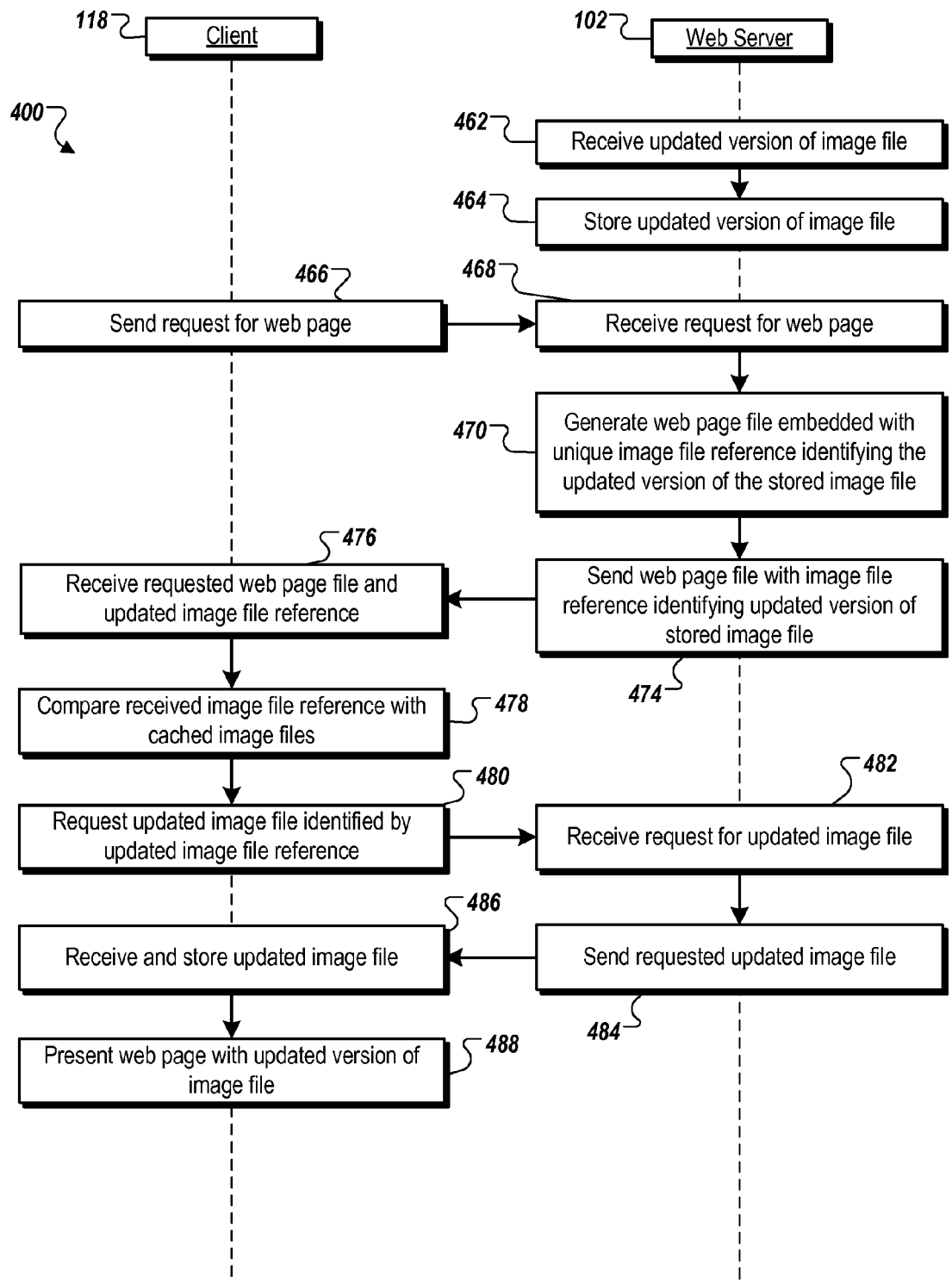

FIGS. 4A, B, and C are signaling and flow diagrams (illustrating method 400) that describe three different interactions between the client and web server that allow the number of server requests from the client to be reduced in accordance with the example environment of FIG. 1. In FIG. 4A, an initial version of an image file is stored at the web server and associated with a particular web page, and the client requests the web page associated with or including the image file reference of the associated image file for the first time. In FIG. 4B, the client (or its web browser) sends a second request for the same web page to the web server (or another web page embedding the same image file), where no changes to the image file or image file reference have been made since the first request of FIG. 4A. In FIG. 4C, the interaction between the systems occurs after the web server receives an updated version of the image file (and thus updates the image file reference associated with the web page), and a third request for the same web page (or another web page embedding or associated with the same image file) is received from the client. The entities involved with the interactions of method 400 are elements from the illustrated environment of FIG. 1, the client 118 (which may perform certain steps using the web browser 128) and the web server 102 (which may perform certain steps using the image file reference update module 105). Although method 400 is described in terms of the illustrated environment 100 of FIG. 1, it should be understood that any other suitable system or environment may also be used to perform method 400.

Beginning at box 403 of FIG. 4A, the web server 102 receives and stores an initial version of a particular image file 112. In some instances, the particular image file may also be associated with a web page 108 stored at the web server 102, while in other instances, the image file 112 may be stored at the web server 102 prior to its association with a web page 108. At box 406, the client 118 (or its web browser 128) sends a request to the web server 102 for a particular web page 108 associated with the stored image file 112. At box 409, the web server 102 receives the client's 118 request for the particular web page 108 and processes the request according to the normal processes of the web server 102.

Further, in response to the requested web page, the web server 102 (in some instances, using some or all of the functionality of the image file reference update module 105 described above) generates the requested web page file at box 412. In some instances, generating the requested web page file may be a dynamic process performed at the server 102 in response to the specific request from the client 118. In other instances, generating the requested web page may comprise identifying or retrieving a stored web page file 108 from the web server 102 associated with the received request. Further, at least one image file may be associated with the generated web page file, such that at least one image file reference uniquely identifying the initial version of the stored image may be generated and embedded within the web page file. For example, the web server 102 can generate an image file reference 110 uniquely identifying the initial version of the stored image file 112 associated with the generated web page file. As previously described, a combination of the URL defining the stored location of the image file 112 and a unique parameter associated with the image file 112 can be used to create the unique image file reference 110. For ease of description in the present example, the image file reference 110 associated with the initial version of the image file 112 will be "www.abc.com/image.jpg?abc." In some instances, the web server's 102 image file reference update module 105 may perform the steps necessary to add the image file reference 110 to the appropriate web page(s) 108. Alternatively, a user or developer working at the web server 102 or through a client 118 associated with the web server 102 through the network 116 can manually update a particular web page 108 by adding the newly generated image file reference 110 into the web page 108 as desired.

In response to and after processing the client's request (and after generating the web page file and associated image file references), the web server 102 sends a copy of the web page file 108 to the client 118 at box 418. Included with the web page file 108 is the image file reference 110 uniquely identifying the initial version of the image file 112 stored at the web server 102. The image file reference 110 may, for example, be included within an image tag of the HTML or XHTML code defining the web page 108. In some instances, the response sent from the web server 102 to the client 118 may be in the form of an HTTP response message sending a copy of the web page 108 to the client 118.

At box 421, the client 118 receives the copy of the requested web page 108 sent from the web server 102, the web page 108 including the image file reference 110 identifying the initial version of the image file 112 stored at 403. The client 118 (via the web browser 128) processes the response from the web server 102 and the web page 108, and recognizes the image file reference 110 included within the received web page 108. At box 424, the client 118 (via its web browser 128) compares the received image file reference 110 with a set of stored (or cached) image files 136 stored locally at (or in some instances, remotely from) the client 118. In particular, the client 118 can compare the image file reference 110 (i.e., "www.abc.com/image.jpg?abc") with a local list of image file references 110 associated with the set of cached image files 136. Because FIG. 4A illustrates the situation where the client 118 (and the web browser 128) have not previously received a copy of the initial version of the image file 112, the comparison performed at the client 118 will not find a matching image file reference 110 within its caches (either the web cache 134 or the cached image files 136). Instead, at box 427 the client 118 (via its web browser 128) sends a request for the image file identified by the image file reference 110 previously received at box 424. The request can include the entire image file reference 110 (i.e., "www.abc.com/image.jpg?abc"), or instead, only the portion of the image file reference 110 prior to the placeholder (i.e., "www.abc.com/image.jpg"). In either instance, at box 430 the web server 102 receives the request for the image file 112, retrieves the requested image file 112 from the location included within the request (i.e., "www.abc.com/image.jpg"), and sends a response to the client 118 at box 433 including the requested image file 112. In instances where the client 118 requests the entire image file reference 110 (i.e., image file URL, placeholder, and unique parameter), the web server 102 can ignore the portions of the image file reference 110 starting at the beginning of the placeholder. In other words, the web server 102 can be programmed to receive the request, ignore the additional information included in the image file reference 110, and retrieve the image file 112 at the appropriate URL. In this manner, no additional processing is required of the web server 102 when processing web page and image file requests.

At box 436, the client 118 receives and stores the requested image file 112 received from the web server 102. Additionally, the stored image file 112 can be associated with the image file reference 110 used to request the image file 112, such that the received image file reference 110 can be compared to later received image file references 110 received by the client 118. The particular image file reference 110 associated with the image file 112 received at box 436 can be stored as metadata associated with the cached image file 136, or may be associated with the image file 112 in a reference table or file used to perform the comparison of box 424. Regardless of the implementation, the client 118 will be able to include the newly received image file 112 and its associated image file reference 110 with the plurality of other image files 112 and image file references 110 used to determine whether a new version of an image is available at the web server 102. Once the client 118 has received and stored the initial version of the image file 112 locally, the client 118 can present the web page 108 in its entirety via the GUI 128 to a user associated with the client 118 at box 439.

FIG. 4B illustrates an example scenario where the client 118 requests the same web page requested at box 406 in FIG. 4A, but where the image file 112 associated with the web page file 108 has not been updated since the previous web page request. Because no changes have been made to the image file 112, the image file reference 110 associated with the web page file 108 will be the same image file reference 110 received at box 421. Thus, starting at box 442, the client 118 sends a request to the web server 102 for the previously-requested web page file 108 (or, alternatively, another web page file 108 associated with the same image file reference(s) 110 included with the web page file). At 445, the web server 102 receives the request and retrieves a copy of the requested web page file 108. At box 448, the web server 102 then sends the copy of the requested web page file 108 to the client 118, along with the image file reference 110 uniquely identifying the previous (or, in this example, the initial) version of the image file 112 associated with the web page 108. At box 451, the client 118 receives the requested web page 108 and the image file reference 110 identifying the stored image file 112 associated with the web page 108. Because the image file 112 has not been updated since the previous web page request at box 412, the image file reference 110 received at box 451 should be identical to the image file reference 110 received at box 421. Thus, when the client 118 compares the received image file reference 110 to the (locally) stored or cached image files 136 at box 454, the client 118 (or its web browser 128) will identify that the image file 112 associated with the unique image file reference 110 has previously been stored or cached at the client 118. As described above, the comparison may be performed on metadata associated with each of the cached image files 136 (identifying the specific image file reference 110 associated with each cached image file 136), while in other instances, the comparison may be performed by a list of image file references 110 linked or associated with the cached image files 136 stored within the web cache 134 (or another location) of the client 118.

At box 457, the client 118 retrieves the stored or cached image file 136 associated with an image file reference 110 exactly matching the image file reference 110 received at box 451. The cached image file 136 associated with the requested web page 108 may then be used to complete the visual representation of the web page file 108 instead of requiring the client 118 to send an additional request to the web server 102 for the same, non-updated image file 112. Instead of determining when to use a cached image file 136 and when to request the web server 102 for the image file 112 based upon cache timeout or expiration settings, the present disclosure sends additional requests to the web server 102 when the client 118 confirms that a particular image file reference 110 received from the web server 102 has not been previously cached by the client 118. Because each image file reference 110 uniquely identifies a particular version of an image file 112, server requests are minimized to cases where the image file is determined to be updated based on the unique identifier of the image file reference 110. Completing this example scenario, at box 460 the client 118 presents the web page 108 via the web browser 128 using the cached image file 112 associated with the initial version of the image file 112 previously received at box 421 of FIG. 4A. Although described in terms of an initial version of the image file 112, FIG. 4B illustrates any interaction or communications between the client 118 and the web server 102 where the image file 112 embedded within the web page file 108 has not been updated since the previous web page request was sent.

FIG. 4C illustrates a third example scenario where, prior to a third request for the same web page 108 (or another web page 108 which includes or embeds the same image file 112 as described in FIGS. 4A and 4B) from the client 118, an updated version of the image file 112 is provided to, uploaded to, or generated at the web server 102. At box 462, the web server 102 receives an updated version of the image file 112 previously associated with the web page file 108, and stores that new version in memory 106 at box 464. In some instances, the new or updated version of the image file 112 can overwrite the previous version of the file so that the URL associated with the updated image file 112 remains the same as the previous version.

At box 466, the client 118 sends a third request (with regards to method 400) for the web page file 108 previously requested at box 412 and box 442. In some instances, the request of box 466 may be for a different web page file 108 that those previously requested during method 400, but which also embeds, includes, or is associated with the same image file 112 associated with the updated version received and stored at boxes 462 and 464, respectively, and that has previously been used in the interactions described in FIGS. 4A and 4B. At box 468, the web server 102 receives the client's 118 request for the particular web page 108 and processes the request according to the normal processes of the web server 102.

At box 470, the web server 102 (in some instances, using the image file reference update module 105 or the server's 102 own functionality) generates a web page file 108 in accordance with the received request from the client 118. Specifically, the web server 102 can use the process described at box 412 in FIG. 4A above to generate the requested web page file 108 embedded with the unique image file reference 110 that identifies the updated version of the stored image file 112. In other words, the web server 102 can dynamically create or generate the web page file 108 in response to the received request, or alternatively, may update the requested web page file 108 stored or persisted at the web server 102 with an updated image file reference 110 based on the updated version of the image file 112.

In combination with generating the requested web page file 108, the web server 102 (using the image file reference update module 105 or similar functionality) generates a new image file reference uniquely identifying the updated version of the stored image file. For instance, while the old version (or as illustrated in FIG. 4A, the initial version) of the image file 112 may be associated with the image file reference 110 of "www/abc.com/image.jpg?abc," the updated image file reference 110 generated at box 470 may be "wwwabc.com/image.jpg?xyz," where "xyz" represents some unique string or value identifying the updated version of the image file 112. Further, the web server 102 (using the image file reference update module 105) may update each persistent or stored web page file 108 associated with the image file 112 to replace the image file reference 110 associated with the previous version of the image file 112 with the updated image file reference 110. Where the web page files are dynamically generated upon request from the client 118, the web server 102 (and the image file reference update module 105) will generate and include the updated image file reference 110 in combination with the dynamic generation of the web page file 108 itself.

At box 474, the web server 102 sends a copy of the requested web page file 108 to the client 118 in a suitable response (i.e., an HTTP response). Embedded within web page file 108 is the newly updated image file reference 110 uniquely identifying the updated version of the image file 112 generated at box 466. At box 476, the client 118 receives the requested web page file 108 from the web server 102, including the updated image file reference 110. Similar to box 421 of FIG. 4A and box 451 of FIG. 4B, the client 118 (via the web browser 128) processes the response from the web server 102 and recognizes or identifies the image file reference included within the web page file 108. At box 478, the client 118 (via its web browser 128) compares the image file reference 110 received at box 474 with the set of cached image files 136. Because the image file reference 110 received at box 474 uniquely identifies the updated image, no matching image file reference 110 will be found at the client 118 or within its associated web cache 134. Because no image file reference 110 matching the updated image file reference received at box 474 is located in the web cache 134 and/or the cached image files 136, at box 480 the client 118 (via its web browser 128) sends a request to web server 102 for the image file 112 located at the URL specified by the updated image file reference 110. At box 482, the web server 102 receives and processes the request for the updated image file 112 associated with the image file reference 110 (ignoring the placeholder and the following unique identifier or parameter therein), and sends the updated image file 112 to the client 118 at box 484. At box 486, the client 118 receives and stores the updated image file 112 received from the web server 102. Using the steps similar to box 436, the updated image file 112 can be associated with the image file reference 110 used to request the image file 112, such that the received updated image file reference 110 can be used in later comparisons with other image file references 110 received from the web server 102 in later scenarios. At box 488, once the image file 112 has been stored and/or cached locally at the client 118, the visual representation of the web page file 108 and its updated (and cached) image file 112/136 can be presented at the client 118.

While the present disclosure uses a plurality of flowcharts and accompanying descriptions to illustrate the example techniques associated with various methods of FIGS. 2 through 4C, environment 100 contemplates using or implementing any suitable technique for performing these and other tasks. It will be understood that these techniques are for illustration purposes only and that the described or similar techniques may be performed at any appropriate time, including concurrently, individually, or in combination. In addition, many of the steps in these flowcharts may take place simultaneously and/or in different orders than as shown and described. Moreover, environment 100 may use processes and methods with additional, fewer, and/or different steps, so long as the processes and methods remain appropriate.

Although this disclosure has been described in terms of certain implementation and generally associated methods, alterations and permutations of these implementations and methods will be apparent to those skilled in the art. For example, the actions described herein can be performed in a different order than as described and still achieve desirable results. As one example, the processes depicted in the accompanying figures do not necessarily require the particular order shown, or sequential order, to achieve the desired results. In certain implementations, multitasking and parallel processing may be advantageous. Further, although described in terms of image files, any other suitable portion of a web page amenable to caching and stored separately from the web page at a web server may also be used in connection with the present disclosure (i.e., media files such as .mp3 files, word processing documents, spreadsheets, Adobe PDF files, etc.). Further, the image files cached at the clients described herein may not necessarily be initially received from interactions with the web page they are presently associated with. In other words, the image file may be shared or used by multiple web pages, such that the image reference file cached at the client may have been retrieved during interactions with a different web page than that currently being presented. Other variations are within the scope of the following claims.

What is claimed is:

1. A computer program product for reducing the number of server requests sent to a web server, the computer program product comprising computer readable instructions embodied on non-transitory media and operable when executed to:
generate a first file reference uniform resource locator (URL) uniquely identifying a first version of a file capable of being cached by a requester, the first file reference URL comprising a network-addressable location of the first version of the cacheable file and a first parameter uniquely identifying the first version of the cacheable file, the first parameter separated from the network-addressable location of the first version of the cacheable file;
embed the file reference URL into a web page file;
send the web page file in response to a request for the web page;
identify a modified second version of the cacheable file;
generate a second file reference URL uniquely identifying the second version of the cacheable file in response to identifying the modified second version of the cacheable file, the second file reference URL comprising a network-addressable location of the second version of the cacheable file and a second parameter uniquely identifying the second version of the cacheable file, the second parameter separated from the second network-addressable location of the second version of the cacheable file, where the network-addressable locations of the first and second versions of the cacheable file are the same;
replace the embedded first file reference URL with the generated second file reference URL in the web page file; and
send the web page file in response to a second request for the web page.

2. The computer program product of claim 1, wherein the location of the first version of the cacheable file includes a name of the file.

3. The computer program product of claim 2, wherein the first parameter uniquely identifying the first version of the cacheable file includes a plurality of data elements.

4. The computer program product of claim 3, wherein the plurality of data elements comprises at least one of the following: a second instance of the file name, a timestamp, or a version number.

5. The computer program product of claim 1, wherein the first parameter uniquely identifying the first version of the cacheable file is automatically generated by a web server when the cacheable file is modified.

6. The computer program product of claim 1, wherein the first parameter is separated from the network-addressable location of the first version of the cacheable file by a predefined character string.

7. The computer program product of claim 1, wherein the web page file substantially comprises a hypertext markup language (HTML) file.

8. The computer program product of claim 1, wherein the cacheable file comprises an image file associated with the web page file.

9. The computer program product of claim 1 further operable when executed to:
store the first version of the cacheable file at the network-addressable location defined by the file reference; and
send the first version of the cacheable file in response to a request for the cacheable file.

10. The computer program product of claim 1, wherein the network-addressable location of the second version of the cacheable file is identical to the network-addressable location of the first version of the cacheable file.

11. The computer program product of claim 1, wherein the second version of the cacheable file comprises an updated version of the first version of the cacheable file.

12. The computer program product of claim 1, wherein the second parameter is different from the first parameter.

13. The computer program product of claim 1, wherein the web page file is dynamically generated in response to the request for the web page.

14. A computer implemented method for reducing the number of server requests sent to a web server comprising:
generating a first file reference uniform resource locator (URL) uniquely identifying a first version of a file capable of being cached by a requester, the first file reference URL comprising a network-addressable location of the first version of the cacheable file and a parameter uniquely identifying the first version of the cacheable file, the parameter separated from the network-addressable location of the first version of the cacheable file;
embedding the file reference URL into a web page file;
sending the web page file in response to a first request for the web page;
identify a modified second version of the cacheable file;
generating a second file reference URL uniquely identifying the second version of the cacheable file in response to identifying the modified second version of the cacheable file, the second file reference URL comprising a network-addressable location of the second version of the cacheable file and a second parameter uniquely identifying the second version of the cacheable file, the second parameter separated from the second network-addressable location of the second version of the cacheable file, where the network-addressable locations of the first and second versions of the cacheable file are the same;
replacing the embedded first file reference URL with the generated second file reference URL in the web page file; and
sending the web page file in response to a second request for the web page, the second request occurring after replacing the embedded first file reference URL with the generated second file reference URL in the web page file.

15. The method of claim 14, wherein the parameter uniquely identifying the first version of the cacheable file includes a plurality of data elements.

16. The method of claim 15, wherein the plurality of data elements comprises at least one of the following: a second instance of the file name, a timestamp, or a version number.

17. The method of claim 14, wherein the first parameter uniquely identifying the first version of the cacheable file is automatically generated by a web server when the cacheable file is modified.

18. The method of claim 14, wherein the web page file comprises a hypertext markup language (HTML) file.

19. The method of claim 14, wherein the cacheable file comprises an image file associated with the web page file.

20. The method of claim 14 further comprising:
storing the first version of the cacheable file at the network-addressable location defined by the file reference URL; and
sending the version of the cacheable file in response to a request for the first version of the cacheable file.

21. The method of claim 14, wherein the second modified version of the file comprises an updated version of the first version of the file.

22. The method of claim 14, wherein the second parameter is different from the first parameter.

23. A computer program product for reducing the number of server requests sent to a web server, the computer program product comprising computer readable instructions embodied on non-transitory media and operable when executed to:
set a cache timeout value associated with the computer program product to a substantively high value;
receive a web page file in response to a request for a network address, the received web page file including an embedded file reference uniform resource locator (URL), the file reference URL uniquely identifying a current version of a file capable of being cached associated with the received web page and comprising a network-addressable location of the version of the cacheable file and a parameter uniquely identifying the current version of the cacheable file, the parameter separated from the network-addressable location of the current version of the cacheable file;
comparing the embedded file reference to a plurality of cached file reference URLs to determine whether the current version of the cacheable file uniquely identified by the embedded file reference URL matches one of the plurality of cached file reference URLs; and
if the embedded file reference URL matches one of the plurality of cached file reference URLs:
retrieving a cached file associated with the matching one of the plurality of cached file reference URLs; and
presenting a visual representation of the received web page file to a user via a graphical user interface (GUI), wherein the visual representation of the received web page includes the retrieved cached file.

24. The computer program product of claim 23, wherein setting the cache timeout value associated with the software to a high value comprises setting the cache timeout value to one year.

25. The computer program product of claim 23, wherein if the embedded file reference URL does not match one of the plurality of cached file reference URLs, the computer program product further operable when executed to:

send a request to the network-addressable location of the current version of the cacheable file for the uniquely identified version of the file;
receive a copy of the uniquely identified current version of the file in response to the request; and
store the copy of the uniquely identified current version of the file in a cache, wherein the stored copy of the uniquely identified current version of the file is associated with the file reference URL.

26. The computer program product of claim 25, the computer program product further operable when executed to:
present a visual representation of the received web page file via a graphical user interface (GUI), wherein the visual representation of the received web page includes the received uniquely identified current version of the file.

27. A system comprising:
one or more processors; and
a non-transitory, computer-readable medium storing computer readable instructions executable by the one or more processors to perform operations comprising:
generating a first file reference uniform resource locator (URL) uniquely identifying a first version of a file capable of being cached by a requester, the first file reference URL comprising a network-addressable location of the first version of the cacheable file and a first parameter uniquely identifying the first version of the cacheable file, the first parameter separated from the network-addressable location of the first version of the cacheable file;
embedding the file reference URL into a web page file;
sending the web page file in response to a request for the web page;
identifying a modified second version of the cacheable file;
generating a second file reference URL uniquely identifying the second version of the cacheable file in response to identifying the modified second version of the cacheable file, the second file reference URL comprising a network-addressable location of the second version of the cacheable file and a second parameter uniquely identifying the second version of the cacheable file, the second parameter separated from the second network-addressable location of the second version of the cacheable file, where the network-addressable locations of the first and second versions of the cacheable file are the same;
replacing the embedded first file reference URL with the generated second file reference URL in the web page file; and
sending the web page file in response to a second request for the web page.

28. The system of claim 27, wherein the first parameter is separated from the network-addressable location of the first version of the cacheable file by a pre-defined character string.

* * * * *